(12) United States Patent
McBain et al.

(10) Patent No.: US 6,793,861 B2
(45) Date of Patent: Sep. 21, 2004

(54) OPTIMIZATION OF IN-MOLD COATING INJECTION MOLDED THERMOPLASTIC SUBSTRATES

(75) Inventors: Douglas S. McBain, Wadsworth, OH (US); Elliott J. Straus, Akron, OH (US); John A. Thompson, Wooster, OH (US)

(73) Assignee: Omnova Solutions Inc., Fairlawn, OH (US)

( * ) Notice: Subject to any disclaimer, the term of this patent is extended or adjusted under 35 U.S.C. 154(b) by 101 days.

(21) Appl. No.: 09/974,644

(22) Filed: Oct. 9, 2001

(65) Prior Publication Data

US 2002/0039656 A1 Apr. 4, 2002

Related U.S. Application Data

(63) Continuation-in-part of application No. 09/614,953, filed on Jul. 12, 2000.

(51) Int. Cl.[7] ............................................... B29C 45/16
(52) U.S. Cl. ................ 264/255; 264/328.8; 264/328.13
(58) Field of Search .............................. 264/255, 328.7, 264/328.8, 328.13, 328.14, 328.16, 230, 342 R; 425/127, 129.1, 130

(56) References Cited

U.S. PATENT DOCUMENTS

| | | |
|---|---|---|
| 2,337,550 A | 12/1943 | Crosby |
| 4,076,788 A | 2/1978 | Ditto |
| 4,081,578 A | 3/1978 | Van Essen et al. |
| 4,115,506 A | 9/1978 | Shima |
| 4,189,517 A | 2/1980 | Shanoski et al. |
| 4,222,929 A | 9/1980 | Shanoski et al. |
| 4,316,869 A | 2/1982 | Van Gasse |
| 4,331,735 A | 5/1982 | Shanoski |
| 4,350,739 A | 9/1982 | Mohiuddin |
| 4,366,109 A | 12/1982 | Svoboda |
| 4,389,358 A | 6/1983 | Hendry |

(List continued on next page.)

FOREIGN PATENT DOCUMENTS

| | | |
|---|---|---|
| CA | 2 406 453 | 11/2001 |
| EP | 0 733 668 A | 9/1996 |
| EP | 0 854 157 A | 7/1998 |
| EP | 0 934 808 A | 8/1999 |
| EP | 1 207 031 A | 5/2002 |
| WO | WO 01 07230 A | 2/2001 |

OTHER PUBLICATIONS

S.N. 60/198,691, Brett, filed Apr. 2001.
Patent Abstract of Japan, vol. 1997, No. 06, Jun. 30, 1997 & JP 09 052262 A (Dainippon Toryo Co. Ltd.) Feb. 25, 1997.

(List continued on next page.)

*Primary Examiner*—Angela Ortiz
(74) *Attorney, Agent, or Firm*—Fay, Sharpe, Fagan, Minnich & McKee LLP; David G. Burleson

(57) ABSTRACT

The present invention is a process for producing an injection-molded thermoplastic workpiece having a thermoset coating bonded thereto, comprising the steps of introducing in three stages into a closed mold a thermoplastic material, such as a polyolefin, heated to a temperature above its melting point and molding said material to form a workpiece; cooling the workpiece to a temperature less than its melt temperature introducing a thermoset coating composition into the closed mold to cover at least a portion of a surface of the workpiece. The mold is then opened and the workpiece is removed after the coating composition has at least partially cured. The invention is also directed to a molded article made by the described process.

35 Claims, 3 Drawing Sheets

U.S. PATENT DOCUMENTS

| | | |
|---|---|---|
| 4,414,173 A | 11/1983 | Cobbledick et al. |
| 4,515,710 A | 5/1985 | Cobbledick |
| 4,668,460 A | 5/1987 | Ongena |
| 4,783,298 A | 11/1988 | Oda |
| 4,798,697 A | 1/1989 | Nohara et al. |
| 4,808,361 A * | 2/1989 | Castro et al. ............... 264/255 |
| 4,921,669 A | 5/1990 | Vetter et al. |
| 4,963,312 A | 10/1990 | Müller |
| 5,053,177 A | 10/1991 | Vetter et al. |
| 5,071,603 A * | 12/1991 | Kurumaji et al. .......... 264/40.5 |
| 5,084,353 A | 1/1992 | Cobbledick et al. |
| 5,132,052 A | 7/1992 | Cobbledick et al. |
| 5,174,933 A * | 12/1992 | Toh et al. .................. 264/40.5 |
| 5,359,002 A | 10/1994 | Cobbledick et al. |
| 5,391,399 A | 2/1995 | Cobbledick et al. |
| 5,496,509 A | 3/1996 | Yamamoto et al. |
| 5,562,979 A | 10/1996 | Easterlow et al. |
| 5,614,581 A | 3/1997 | Cobbledick et al. |
| 5,632,949 A | 5/1997 | Fisher et al. |
| 5,639,403 A | 6/1997 | Ida et al. |
| 5,658,672 A | 8/1997 | Lenke et al. |
| 5,736,090 A | 4/1998 | Yamamoto et al. |
| 5,777,053 A | 7/1998 | McBain et al. |
| 5,849,168 A | 12/1998 | Lutz |
| 5,882,559 A | 3/1999 | Eckardt et al. |
| 5,902,534 A | 5/1999 | Fujishiro et al. |
| 5,906,788 A | 5/1999 | Boeckler |
| 6,180,043 B1 | 1/2001 | Yonemochi et al. |
| 6,328,920 B1 | 12/2001 | Uchiyama et al. |
| 6,558,599 B1 | 5/2003 | Bethune |

OTHER PUBLICATIONS

The Sabreen Group, Inc.'s "Preparing Plastics for Painting" article.

Chlorocarbons and Chlorohydrocarbons–$C^2$ to Combustion Technology, Kirk–Orthmer *Encyclopedia of Chemical Technology*, Fourth Edition, vol. 6, (1993), pp. 676–690.

GE Plastics Processing Guide, *GE Engineering Thermoplastics Injection Molding Processing Guide*, General Electric, 1998, pp. i–iv.

GE Injection Molding Mold Design, *GE Engineering Thermoplastics Injection Molding Processing Guide*, General Electric, 1998, pp. 1–1–1–24.

GE Injection Molding Processing, *GE Engineering Thermoplastics Injection Molding Processing Guide*, General Electric, 1998, pp. 2–1–2–12.

GE Injection Molding Troubleshooting Guide, *GE Engineering Thermoplastics Injection Molding Processing Guide*, General Electric, 1998, pp. 3–1–3–7.

Long Fiber Reinforced Thermoplastics, *Injection Molding Guide*, Celstran, 1999, Page(s) 1–27.

Barrett J; "Plastic Panels are Coated in Mould", Eureka (Inc. Engineerign Materials and Design), Findlay Publications, Horton Kirby, Kent, GB, vol. 12, NR. 2, pp. 31–32 XP000328032 ISSN: 0261–0297, the whole document.

* cited by examiner

OPTIMIZATION OF IN-MOLD COATING INJECTION MOLDED THERMOPLASTIC SUBSTRATES

This Application is a continuation-in-part of U.S. application Ser. No. 09/614,953, filed Jul. 12, 2000, for METHOD FOR IN-MOLD COATING A POLYOLEFIN ARTICLE.

FIELD OF INVENTION

The present invention relates to a method of producing an in-mold coated thermoplastic workpiece. More specifically the process comprises the steps of forming a substrate by injection molding a thermoplastic polymeric material and thereafter injecting, as soon as the substrate falls below its melt point, a coating material into the closed mold containing the substrate which is maintained at a constant clamp pressure to coat at least a portion of one of the surfaces of the substrate with the coating material. The substrate and in-mold coating are introduced into the mold using known injection molding techniques.

BACKGROUND OF THE INVENTION

The in-mold coating, which is sometimes referred to as IMC, of molded plastic parts, particularly automobile and truck body panels, is a widely used commercially acceptable method of production. Up to the present these commercially accepted items have almost all been made by compression molding using a fiberglass reinforced plastic (FRP) substrate. The most widely used processes are those described in U.S. Pat. No. 4,076,788. The in-mold coating materials generally used therewith are of the type described in U.S. Pat. Nos. 5,658,672; 5,614,581; and 5,777,053.

The parts that have been manufactured using the above-described processes and materials have generally been relatively large and relatively flat. This is due in part to the inherent constraints of applying a coating to a compression molded part and has limited what might be a very useful method to relatively few parts.

Until relatively recently there have been no commercially acceptable in-mold coating injection molding techniques. More recently, however, an application describing an injection molding technique and the in-mold coating used in the process was developed by some of the inventors of this invention and is more fully described in pending U.S. patent application Ser. No. 09/614,953.

Another in-mold coating process which contemplates injection molding is described in U.S. Pat. No. 6,180,043B1. That in-mold coating method uses multi-stagewise variable clamping pressures. The scenario in changing pressures in this process is time consuming and, accordingly, decreases the throughput of the molding machine on which it is being practiced. In other words, machine throughput, i.e. number of articles produced per unit of time, is not maximized.

SUMMARY OF INVENTION

The present invention is a process for producing a thermoplastic workpiece having a coating bonded thereto, comprising the steps of injecting, using a filling pressure, into a closed mold which is maintained under a constant clamping pressure, a thermoplastic material, such as a polyolefin, heated to a temperature above its melting point, until said mold is substantially full, completely filling said mold with said material using a packing pressure to form a workpiece; maintaining said thermoplastic material, as it cools, under a mold pressure; injecting, immediately after the workpiece cools to its melt temperature or as it is sometimes referred to melting point, a coating composition into the closed mold to contact at least a portion of a surface of the workpiece. The mold is opened and the workpiece is removed after the coating composition has at least partially cured.

A process for the production of substrates of a thermoplastic having in-molded coatings thereon has been developed. In-mold coating of a substrate or workpiece, whereby the coating composition has good flow and coverage during molding, good adhesion, uniform color, good surface quality, and, if necessary, good paintability, may be successfully achieved by the practice of the process of the present invention.

It is an object of the present invention to provide an injection molding process by which substrates may be coated with in-mold compositions, to form finished workpieces which are suitable for use as is in end use applications or which require minimal surface post-treatment.

Another object is to maximize the output of expensive injection molding equipment.

It is a further object of the present invention to eliminate the time and cost of pretreating a workpiece to accept a paint or other coatings thereon.

A further object of the present invention is to provide a workpiece having an appearance in-mold coating thereon, which has paint-like properties, such as high gloss, hardness, good adhesion and good weatherability.

A further object of the present invention is to provide a workpiece having an in-mold coating thereon, which has good flow and coverage during molding, good adhesion, uniform color, durability, weather resistance, good surface qualities, and good paintability.

Injection Molding

Injection molding is a well known and probably the most widely used method of producing plastic parts. In a typical process pelletized, granular or powdered plastic material is fed from a hopper into a heating cylinder. There it is softened by being forced through the heated cylinder, usually by a screw. The softened plastic is then injected into a closed mold, most often by using the screw as a ram. Pressure is maintained on the mold and on the plastic until the plastic reaches a state where it can be removed from the mold without distortion.

The mold into which the plastic is injected is in two parts; one stationary, and the other movable. The mold cavity generally has a first surface on the first mold half, upon which a show or finished surface of the molded article will be formed, and a corresponding or opposite second surface on the second mold half. The mold is opened and closed either mechanically or hydraulically usually using a predetermined timing cycle. The stationary half normally houses the cavity section of the mold and is mounted on the stationary platen in contact with the injection section of the cylinder of the injection machine. The movable mold half usually holds the core and the ejector mechanism. The injection of the plastic material occurs under pressure when the mold is in a closed position. The clamping pressure, that is the pressure used to keep the mold closed during the injection of the plastic must be greater than the pressure used to inject the plastic.

Injection molding machines are often rated according to the maximum number of ounces of uniformly heated plastic that can be injected into the mold with one complete stroke of the injection ram. Shot sizes typically range from about ten to 260 ounces but may be smaller or larger. Another method of measuring machine capability is the clamp force, usually in tons, available to hold the mold closed during the high pressure injection. Usual injection molding pressures range from 10,000 to 30,000 psi.

Most injection molding machines are horizontal but some are of the vertical type. Another machine variation is a so called two stage injection unit.

Another essential component of the machine is the clamp assembly which opens and closes the mold and ejects the finished part and further prevents the mold from opening during the pressure build up resulting from the injection of the material to be molded into the mold cavity. The clamping devices used today may be either mechanical, hydraulic or hydromechanical. The type most often used is a toggle clamp. In this set up, prior to injection, mechanical links in the clamp are collapsed or untoggled and the mold is opened. Pressure is then applied forcing the links to extend and then close the mold and at its fullest extension the linkage is in a position such that pure mechanical pressure holds the mold closed. Hydroelectric clamps and hydromechanical clamps may also be used.

The invention may be practiced using any of the various types of injection molding machines provided that provision is made to inject the in-mold coating.

The practice of this invention requires the application of a second polymeric material generally referred to as an in-mold coating (IMC) onto at least a portion of the substrate which was molded as described above. The additional equipment needed to apply it is a second injector, the IMC injection nozzle of which is preferably located within the tool parting line and on either mold half, and preferably on the mold half opposite the ejector systems and thermoplastic injection gates or sprues. The mold cavity also contains separate orifices to allow the first and second composition injectors to inject their output into the mold. The injector may be located in the movable mold half or the stationary mold half. The IMC is injected directly through a nozzle into the mold cavity and onto a surface of the substrate. In some instances due to the complexity of the substrate more than one nozzle may be required to inject either or both the substrate polymer and IMC. During the entire molding operation it is essential that the mold be maintained in a tightly closed, i.e. locked position so that there can be no leakage of either the substrate or IMC.

Close control of the processing variables is essential for successful molding. Machine controls accurately govern such functions as temperatures, times, speed, hydraulic and melt pressures and component positions. This is usually accomplished using microprocessors and microcomputers which allow integration of the various machine functions, which will be discussed in some detail below, and to a single system control and monitoring set up which handles all of the operations of the clamp, the injection unit, the injector mechanism as well as some ancillary equipment.

As discussed in more detail below injection molding can be carried out with virtually all thermoplastic resins.

IMC

The process of the present invention utilizes in-mold coatings, many of which are available commercially. Such coatings include GenGlaze® and Stylecoat®, appearance in-mold coatings available from Omnova Solutions Inc. as well as others. These and other coatings are well known to the art. The main advantage of acrylic coatings is the high degree of resistance to thermal and photoxidation and to hydrolysis, giving coatings that have superior color retention, resistance to embrittlement and exterior durability. Low-molecular weight acrylic resins having an average functionality of two to three and contain few molecules that are nonfunctional or only monofunctional, are useful in the present invention.

Epoxy resins are also useful in the present invention. A principal use of epoxy resins is as a component in two-package primer coatings. One part contains the epoxy resin and the other part contains a polyfunctional amine. Amine-terminated polyamides, sometimes called amido-amines, are widely used. A preferred epoxy resin is an epoxy-based oligomer having at least two acrylate groups and at least one copolymerizable ethylenically unsaturated monomer, and at least one copolymerizable monoethylenically unsaturated compounds having a —CO—, group and a —NH2—, NH, and or —OH— group.

The present invention also contemplates the use of other resin coatings, such as alkyds, polyesters, urethane systems, amino resins, phenolic resins, and silicone resins. See e.g., Kirk Othmer, Encyclopedia of Chemical Technology, Vol. 6 ($4^{th}$ ed. 1993) at pp. 676–690.

In-mold coatings comprising five components, namely
1) a saturated aliphatic polyester intermediate urethane
2) an aliphatic polyether
3) an aliphatic or cycloaliphatic portion (meth)acrylate
4) hydroxy alkyl (meth)acrylates
5) vinyl substituted aromatics have been found to have particular utility in the practice of this invention. In-mold coating compositions useful in the practice of the invention are prepared as follows. The polyester urethane acrylate is mixed with the vinyl substituted aromatic monomers such as styrene, the saturated aliphatic or cycloaliphatic (meth) acrylates such as isobornyl acrylate, and the hydroxyalkyl methacrylate, such as hydroxypropyl methacrylate. After these compounds are mixed, fillers and additives, such as cure inhibitors, light stabilizers, lubricants, etc., are added and mixed. The free radical generating initiator is added last. The polyacrylate ester of a polyol can be present in the polyester urethane acrylate from the supplier. This in-mold coating composition is clear after curing.

Any of the coatings contemplated for use in the present invention can be colored by utilizing a pigment, a colorant, etc., in a desired or effective amount to yield a desired color, tint, hue, or opacity. Pigments, pigment dispersions, colorants, etc. are well known to the art and include, for example, graphite, titanium dioxide, carbon black, phthalocyanine blue, phthalocyanine red, chromium and ferric oxides, aluminum or other metal flake, and the like.

When an in-mold coating having a specific color is desired, one or more pigments, colorants, etc., can be utilized in suitable amounts. As known to the art, often times various pigments or colorants are added with a carrier, for example, a polyester, so that they can be easily blended. Any suitable mixing vessel can be utilized, and the various components and additives mixed until the compounds are blended. Even if pigments are not contained in the blend, the mixture at this point is not clear.

All of the above-described in-mold coating compositions that may be utilized in the present invention may contain other additives and fillers, etc., in amounts known to the art. For example, various cure inhibitors such as benzoquinone, hydroquinone, methoxyhydroquinone, p-t-butylcatechol, and the like, can also be utilized. Other additives may include an accelerator, such as cobalt octoate. Other classes of accelerators include zinc, or other metal carboxylates. Various light stabilizers can also be utilized such as, for example, the various hindered amines (HALS), substituted benzophenones, and substituted benztriazoles, and the like. Lubricants and mold release agents are generally utilized with specific examples including various metal stearates, such as zinc stearate or calcium stearate or phosphonic acid esters. Reinforcing fillers, such as talc, can be utilized. Other additives include hardeners, thixotropes, such as silica, and adhesion agents, such as polyvinyl acetate.

Some of the in-mold coatings contemplated by the present invention are chain extended through the utilization of a free radical initiator, such as a peroxide. Examples of suitable free radical initiators include tertiary butyl perbenzoate, tertiary butyl peroctoate in diallyl phthalate, diacetyl peroxide in dimethyl phthalate, dibenzoyl peroxide, di (p-chlorobenzoyl) peroxide in dibutyl phthalate, di (2,4-dichlorobenzoyl) peroxide in dibutyl phthalate dilauroyl peroxide, methyl ethyl ketone peroxide, cyclohexanone peroxide in dibutyl phthalate, 3,5-dihydroxy-3,4-dimethyl-1,2-dioxacy-clopentante, t-butylperoxy (2-ethyl hexanoate), caprylyl peroxide, 2,5-dimethyl-2,5-di (benzoyl peroxy) hexane, 1-hydroxy cyclohexyl hydroperoxide-1, t-butyl peroxy (2-ethyl butyrate), 2,5-dimethyl-2,5-bis (t-butyl peroxy) hexane, cumylhydroperoxide, diacetyl peroxide, t-butyl hydroperoxide, ditertiary butyl peroxide, 3,5-dihydroxy-3,5-dimethyl-1,2-oxacyclopentane, and 1,1-bis (t-butyl-peroxy)-3,3,5-trimethyl cyclohexane and the like, and mixtures thereof. It is sometimes desirable to use mixtures of initiators to take advantage of their different decomposition rates and times at different temperatures and so forth. A preferred initiator to use is tertiary butyl perbenzoate.

Azo-initiators useful for the non-aqueous application of this invention include: 2,2'-azobis (2,4-Dimethyl-pentanenitrile); 2,2'-azobis (2-Methylpropanenitrile); 2,2'-azobis (2-Methylbutanenitrile); 1,1'-azobis (Cyclohexanecarbonitrile); 2,2'-azobis (4-Methoxy-2,4-dimethyl-valeronitrile); Dimethyl-2,2'-azobisisobutyrate; 2-(Carbamoylazo)-isobutyronitrile; 2,2'-azobis (2,4,4-Trimethylpentane); 2-Phenylazo-2,4-dimethyl-4-methoxy-valeronitrile); and 2,2'azobis (2-methylpropane).

The initiators should be used in an amount sufficient to overcome any effect of any inhibitors used and to cause curing of the ethylenically unsaturated compounds. In general, the peroxide initiator is used in an amount of up to about 5% or from about 0.25 to about 5%, desirably from about 0.5 to about 2%, and preferably from about 0.5 to about 1%, by weight, based on the total weight of all of the ethylenically unsaturated components employed in the in-mold coating compositions.

The process of the present invention contemplates a reaction of the in-mold coating compositions, in the presence of an initiator. In the present process, activation temperatures of the initiators used are less than the melt temperature of the substrate. These initiators do not "kick off" the free radical initiator until after the IMC is injected into the closed mold containing a formed substrate. At that time the substrate has cooled to a temperature below its melt point.

There is a relationship between the melt temperature of the thermoplastic used as the substrate and the half life of the initiator used in the in-mold coating. The half life at a particular temperature of the initiator must be such that it institutes the reaction of the in-mold coating at a temperature below the melt temperature of the substrate thermoplastic while enabling the reaction to go to substantial completeness before the coated workpiece is removed from the mold.

Substrates

The resins useful as substrates in the practice of the invention are manifold but must be thermoplastic. The only requirement is that the substrate resin be amenable to being injection molded in commercially available equipment. Resins useful in the practice of the invention include PET or polyethylene terephthalate, polystyrene, PBT or polybutylene terephthalate and PBT alloys, polypropylene, polyurethane, ABS or acrylonitrile-butadiene-styrene copolymer, PVC or polyvinyl chloride, polyesters, polycarbonates, PP/PS or polypropylene polystyrene alloys, polyethylene, nylon, polyacetal, SAN or styrene acrylonitrile, acrylics, cellulosics, polycarbonate alloys and PP or propylene alloys. Other combinations of these materials may be used. The foregoing list is not meant to be exhaustive but only illustrative of the various materials useful in the practice of this invention.

Set out below in Table I are the melt temperatures (as reported in Plastics Digest Edition 20, Vol. 1) of a number of thermoplastics useful in the practice of this invention. If mixtures are used or if the melt temperature of a particular polymer is not available it may be determined using ASTM D3418.

TABLE I

Thermoplastic Melt Temperatures

| Material | Melt Temperature ° F. |
| --- | --- |
| Polyester | 485 |
| Polystyrene | 350 |
| PBT Copolymer | 525 |
| Polypropylene | 400 |
| TPU's (thermoplastic polyurethane | 550 |
| ABS | 450 |
| PVC | 380 |
| Polycarbonates | 545 |
| PP/PS Alloys | 610 |
| Polyethylene | 350 |
| Nylon | 560 |
| Polyacetal | 330 |
| SAN | 400 |
| Acrylics | 350 |
| PC Alloys | 545 |
| PP Alloys | 490 |

DETAILED DESCRIPTION OF THE INVENTION

Figure 1:
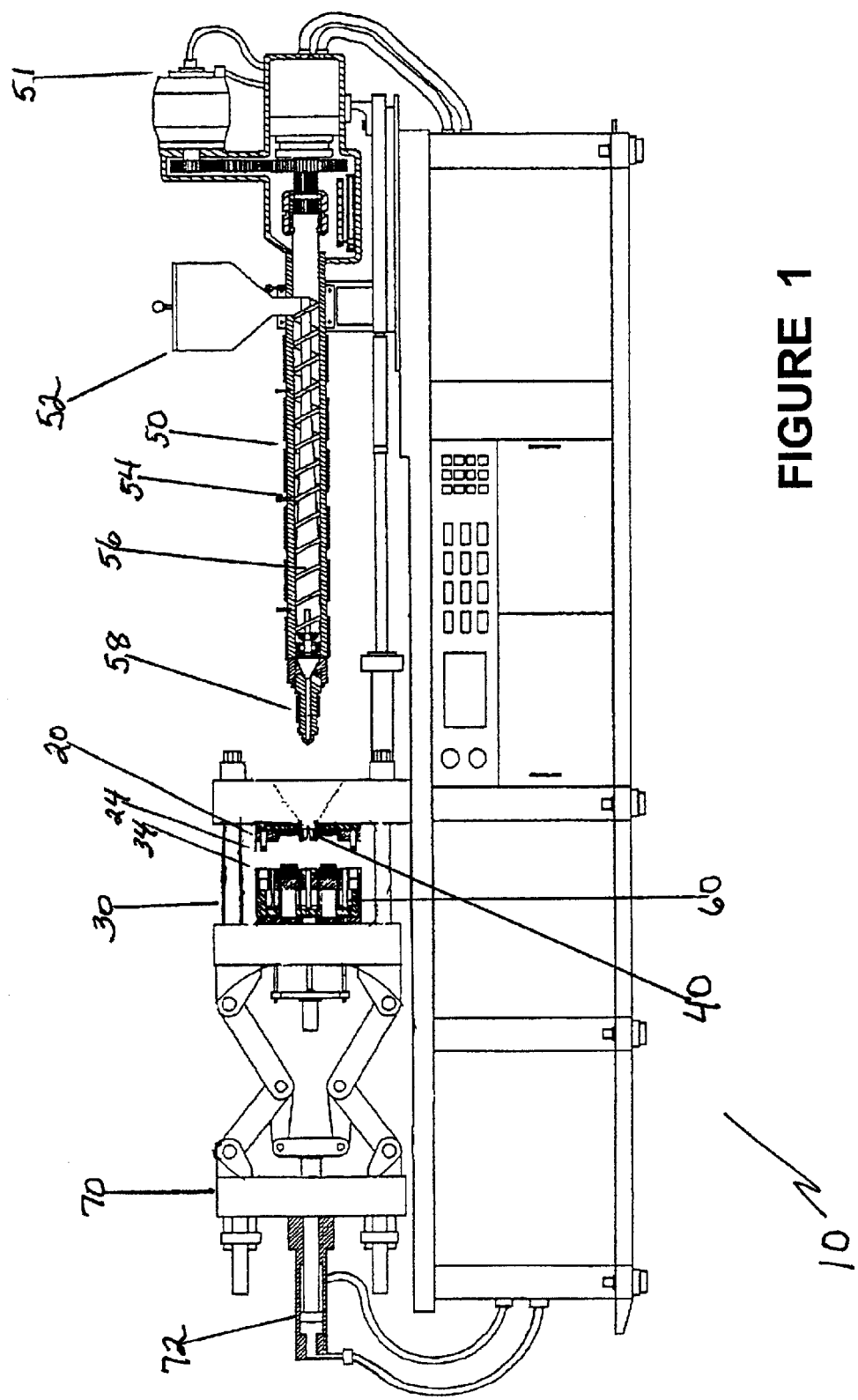
FIG. 1 is a side view of one embodiment of the molding apparatus of the present invention.

A typical molding apparatus useful in the practice of the present invention is described in detail below. Making reference now to the drawings where like numerals indicate like or corresponding parts throughout the figures, a molding apparatus is shown in FIG. 1, and is generally designed 10.

Molding apparatus 10 includes a first mold half 20 which remains in a stationary or fixed position relative to a second moveable mold half 30. FIG. 1 shows the mold halves in an open position. The first mold half and second mold half are adapted to slidingly mate, or nest to a mold cavity 40. The mold halves mate along surfaces 24 and 34 when the molding halves are in the closed position, forming parting line 42.

The moveable mold half 30 reciprocates generally along a horizontal axis relative to the first or fixed mold half 20 by action of a clamping mechanism 70 with a clamp actuator 72 such as through a hydraulic or mechanical actuator as known in the art. The clamping pressure exerted by the clamping mechanism 70 has an operating pressure in excess of the pressures generated during molding.

Figure 2:
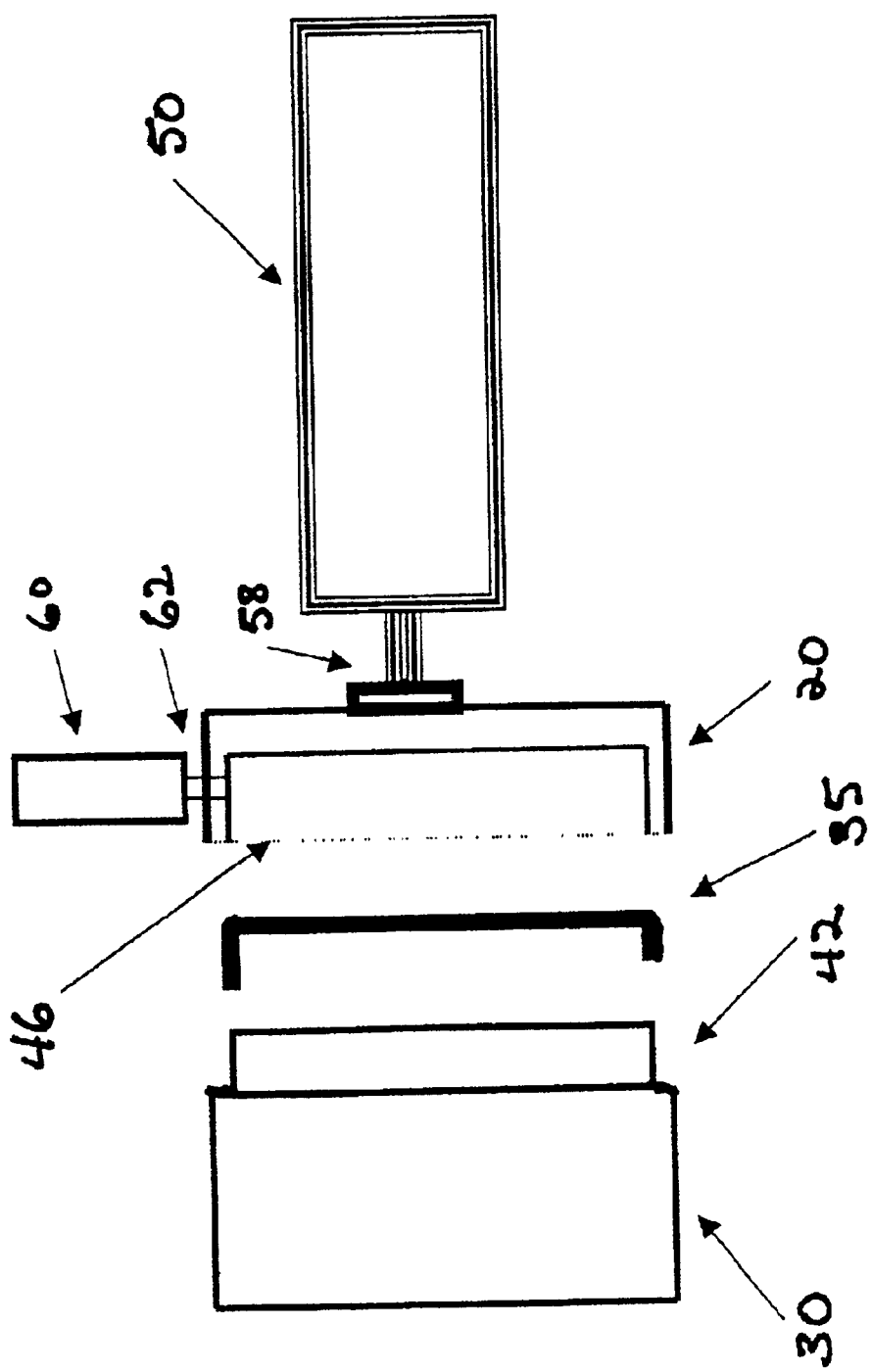
FIG. 2 is a cross section of a mold cavity containing a molded substrate and showing the location of a second composition injector in the molding apparatus.

In FIG. 2, the mold halves 20 and 30 are shown in a closed position and contain workpiece 35 abut or mate along parting line 42. As illustrated, the mold cavity shows a cross section. The design of the mold cavity can vary greatly in size and shape according to the end product to be molded. The mold cavity has a first surface 44 on the first mold half, upon which a show surface of an article will be formed, and a corresponding or opposite second or non show surface 46 on the second mold half. The mold cavity may also contain separate orifices allowing injection through more than one injector.

As shown in FIG. 1, the first composition injector 50 is a typical injection molding apparatus which is well known to those of ordinary skill in the art and which is capable of injecting a thermoplastic or thermosetting composition into the mold cavity. The first composition injector is shown in a "backed off" position, but it is readily understood that the same can be moved to a horizontal direction so that nozzle or resin outlet 58 mates with mold half 20 and can inject into mold cavity 40. For purposes of illustration only, the first composition injector in FIG. 1 is a reciprocating-screw machine wherein a first composition may be placed in hopper 52 and rotating screw 56 moves the composition through the heated extruder barrel 54, where the material is heated above its melting point. As the material collects in the end of the barrel, the screw acts as an injection ram and forces the extrudate through the nozzle 58 into the mold. The nozzle generally has a non-return valve at the nozzle or screw tip to prevent backflow into the screw. The nozzle may also contain means to heat or cool to better control the temperature and thus flow properties of the extrudate.

In some instances because of the size and/or complexity of the part being formed, the extrudate may be injected into the mold from more than one location. In order to control the flow of the extrudate through this manifold, it may be necessary to heat the extrudate in order to make it flow easier or more rapidly. These manifold passages may be referred to as hot runners or manifold systems and are shown in detail in FIG. 3.

The first composition injector is not meant to be limited to the embodiment shown in FIG. 1 but can be any apparatus capable of injecting a thermoplastic or thermosetting composition into the mold cavity. Suitable injection molding machines are available from Cincinnati Milacron, Battenfeld, Toshiba, Engel, Husky and others.

In operation, a predetermined quantity of a first composition 80 is injected into the mold cavity from the first composition injector 50, forming a substrate or workpiece.

The substrate formed in the mold cavity from the first composition has at least a show surface 82 and an opposite surface 84. A second composition 90, which is an in-mold coating composition, is then introduced into the mold cavity from the second injector 60. This injection is in the practice of this invention, begun after the previously injected material has begun to cool. This time is predetermined as described in more detail below. As shown in FIG. 2 the second injector 60 is located in the mold half not containing the first composition injector 50. More specifically, the first composition injection 50 is located in the fixed mold half 20 and the second composition injector is located in the movable mold half 30.

As shown in FIG. 2, the in-mold coating composition 90 is injected through nozzle 62 into the mold cavity 40. It is important to note that the mold is not opened or unclamped before the in-mold coating is applied. That is, the mold halves maintain a parting line and remain in a closed position during the injection of both compositions.

The in-mold coating composition spreads out and coats a predetermined portion or area of the substrate shown surface 82.

Figure 3:
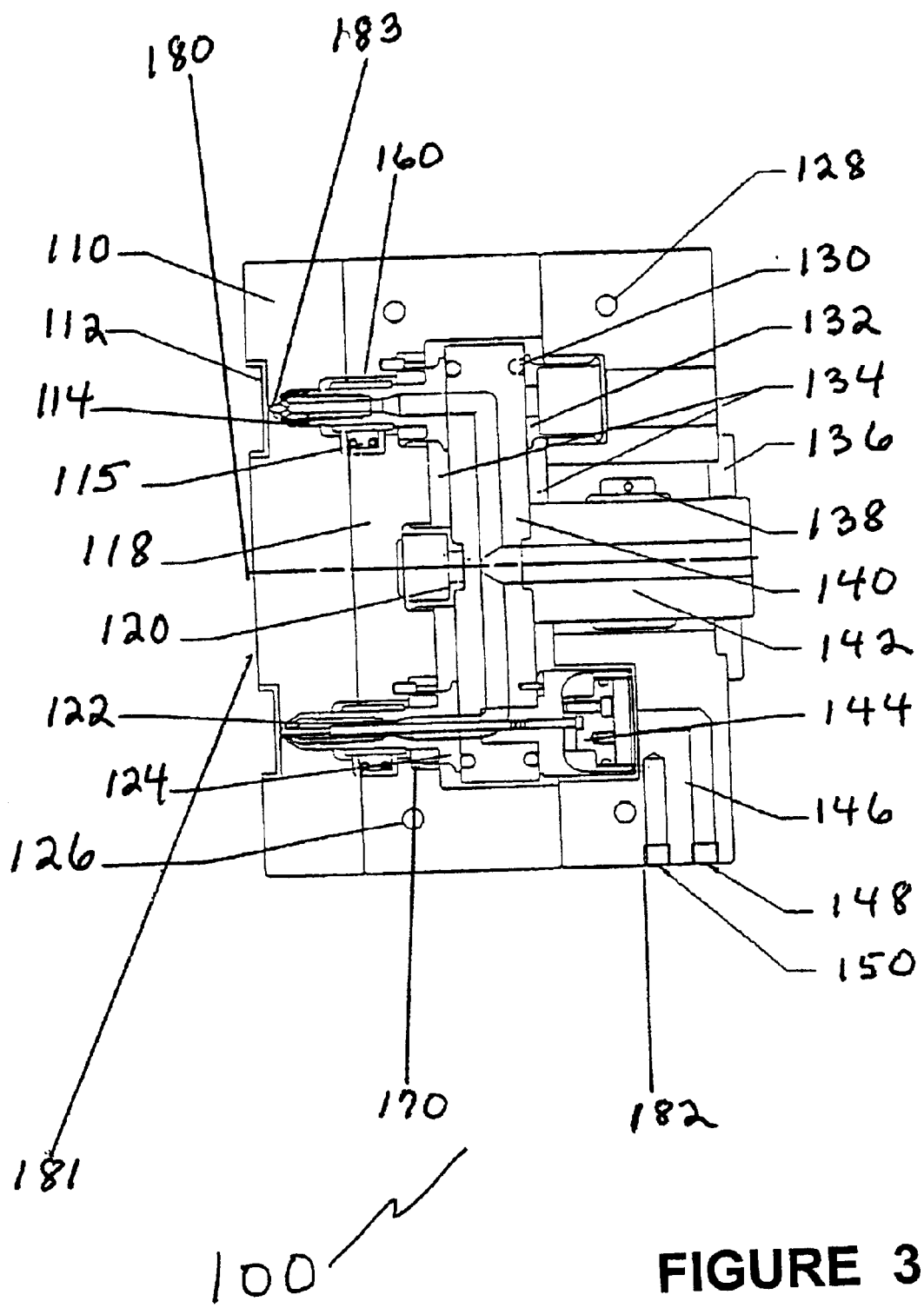
FIG. 3 is a cross section of a hypothetical first or stationary mold half of the type shown in FIG. 1.

FIG. 3 depicts a hypothetical first or stationary mold half of the general design shown in FIG. 1. The drawing depicts a typical runner system inside the mold which is used for the delivery of the plastic into the mold cavity and is illustrative of two types of gates namely those denominated hot tip and valve gate either of which may be used in the practice of this invention. In FIG. 1, 100 is a mold half. The polymer being fabricated is delivered from the injection unit through the bushing 112. A hot tip system is indicated by 160 and a valve gate system by 170. Cavity plate 110 is the portion of the mold adjacent the part to be formed. A nozzle tip insulator, the function of which is to prevent the cavity plate from acting as a heat sink, is indicated by 114. Nozzle heater 115 is also part of the system to maintain the correct temperature of the plastic being injected.

The manifold heater 118 functions to keep the manifold hot. Sprue insulator 120 functions as part of the temperature maintenance system. Nozzle tip 122 is the actual point of delivery of the plastic into the mold and is located in nozzle housing 124. Cooling lines through which water or oil are circulated to heat or cool, as is required by the polymer being used, are indicated by 126 and 128. Manifold heater 130, nozzle insulator 132 and air gap 134 all are part of the temperature maintenance system. Locating ring 136 is used to locate the mold relative to the injection nozzle. Sprue heater 138 is located on sprue bushing 142. The manifold 140 generally is the basis or foundation for the whole system. Valve gate 144 is part of the delivery system for nozzle tip 122. It is actuated by air open conduit 150 and air close conduit 148. Pressure transducer 180 measures the pressure in the mold more than one such transducer is generally used. A temperature transducer 182 is used to determine the temperature in the mold. More than one such transducer is generally used.

The practice of the invention is not dependent upon a particular type of resin delivery system but any of the systems currently in commercial use may be used.

The injection of the plastic used to form the substrate into the mold in the practice of this invention may be viewed as a three-stage process. The first stage is usually referred to as injection high. The optimum pressure used to inject the plastic from the injection machine into the mold is determined by experimentation but it must be sufficiently great so that the mold is filled to at least about 75 percent of its capacity. The pressure time, plastic mold size and configuration are all determining factors. Generally the pressure is increased until flash is noticed at the parting line of the mold; then it is slightly decreased.

The next stage of injection is referred to as injection pack. It too must be determined by a series of experiments and must be of a magnitude such that, at its completion, the mold cavity is filled to at least 99 percent of its capacity.

Thereafter the injection pressure is reduced. This stage is referred to as injection hold and as with the other two, is determined by experimentation. The function is to keep the workpiece from distorting.

In the practice of the invention it is important to determine the ultimate machine conditions for the use in a given machine using a specific mold, specific substrate material and a specific IMC. In setting up the machine a large number of variables must be interrelated in order to produce acceptable parts in a minimum time.

Pressures, times and other settings of the injection machine vary with the configuration of the mold, i.e. shape of the part being manufactured and the polymeric material being used. In order to optimize these and the other critical operating parameters of the injection process, it is necessary to run a series of experiments with the mold and a specific polymeric material. The volume of any given mold may be calculated. Based on this calculation and the density of the polymer, the size of the charge can be determined. Differing machine variables are tried until an optimum, complete filling of the mold in a minimum time, is determined. Preferably in these experiments, the mold is fitted with transducers which measure pressure and/or temperature, as various machine variables, e.g. injection speeds and pressures are altered.

It is known in the art that variations in the amount of resin injected are tolerable in an amount of ±1½% of the total weight of the charge. Such variations occur in part because the resin is compressable and acceptable parts are produced within this range.

As is known in the art the determination of the optimum operating variables in the injection molding of a new part is basically a trial and error technique. While an experienced technician may have some idea as to what is required, he/she must nonetheless be prepared to generate a certain amount of scrap with any new set up. A choice is made of these variables, for example, barrel temperature, mold temperature, injection high pressure limit, injection hold pressure, injection speed, fill time, and holding time. Extreme adjustments are made in an effort to bracket operable conditions which may be fine tuned.

A series of experiments were run using a Cincinnati Milacron 850 ton hydraulic clamp injection molding machine in order to determine the optimum machine settings in respect of a number of substrate materials. The substrate materials and the machine settings found to yield optimum results are set out in Table II below. As mentioned above, these settings were arrived by trial and error using a bracketing procedure.

The mold used in this procedure resembles a valve cover for an automotive engine. Essentially it is in the shape of an open box with turned down sides.

TABLE II

| Substrate Resin:<br>Machine Setpoints | | Ex 1<br>Impet[1]<br>polyester<br>EKX215<br>° F. | Ex. 2<br>Impet[1]<br>EKX-230<br>° F. | Ex. 3<br>Fortron[2]<br>4184L6<br>° F. |
|---|---|---|---|---|
| Nozzle | | 502 | 502 | 580 |
| Barrel | Zone A | 509 | 509 | 598 |
| Temperature | Zone B | 511 | 511 | 588 |
| | Zone C | 511 | 511 | 587 |
| | Zone D | 509 | 509 | 577 |

TABLE II-continued

| Mold | Zone 1 | 500 | 500 | 580 |
|---|---|---|---|---|
| Temperature | Zone 2 | 500 | 500 | 580 |
| | Zone 3 | 300 | 300 | 300 |
| | Zone 4 | 500 | 500 | 580 |
| | Zone 5 | 300 | 300 | 300 |
| | Zone 6 | 500 | 500 | 580 |
| | Zone 7 | 500 | 500 | 580 |
| | Zone 8 | 500 | 500 | 600 |
| Stationary Mold Temperature | | 242 | 242 | 272 |
| Moving Mold Temperature | | 275 | 275 | 297 |
| Time in seconds | | | | |
| Injection High | | 10.00 | 10.00 | 10.00 |
| Injection Pack | | 4.00 | 4.00 | 3.00 |
| Injection Hold | | 4.00 | 4.00 | 2.00 |
| Cooling | | 90.00 | 60.00 | 60.00 |
| Clamp Open | | 0.00 | 0.00 | 0.00 |
| Ejector forward dwell | | 0.99 | 0.00 | 0.00 |
| Extruder delay | | 0.00 | 0.00 | 0.00 |
| Core Set | | 0.80 | 0.80 | 0.80 |
| Lbs. Per sq. inch | | | | |
| Injection high pressure limit | | 2200 | 2200 | 2200 |
| Inection Pack pressure #1 | | 1000 | 1100 | 800 |
| Injection Pack pressure #2 | | 1000 | 1100 | 800 |
| Injection Hold pressure #1 | | 900 | 900 | 700 |
| Injection Hold pressure #2 | | 900 | 900 | 700 |
| Inches | | | | |
| Shot size | | 3.10 | 3.05 | 2.70 |
| Transfer position | | 1.40 | 0.70 | 1.20 |
| Decompression before | | 0.00 | 0.00 | 0.00 |
| Decompression after | | 0.30 | 0.30 | 0.30 |

| Injection<br>Profile: | Speed | % of<br>shot<br>size | Speed | % of<br>shot<br>size | Speed | % of<br>shot<br>size |
|---|---|---|---|---|---|---|
| Seq. 1 | 1.25 | 80 | 1.25 | 80 | 1.00 | 80 |
| Seq. 2 | 1.10 | 60 | 1.10 | 60 | 1.00 | 60 |
| Seq. 3 | 1.00 | 40 | 1.00 | 40 | 1.00 | 40 |
| Seq. 4 | 1.00 | 20 | 0.60 | 20 | 1.00 | 20 |
| Seq. 5 | 0.60 | X-FER | 0.60 | X-FER | 0.60 | X-FER |

[1]A 30% glass filled polyester obtained from Ticona.
[2]A PPS obtained from Ticona.

TABLE III

| Resin/Substrate:<br>Machine Setpoints | | Ex 4<br>Fortron[2]<br>1140L7<br>° F. | Ex. 5<br>Xenoy-2390[3]<br>° F. | Ex. 6<br>NNP-30-2000[4]<br>° F. |
|---|---|---|---|---|
| Nozzle | | 580 | 550 | 522 |
| Barrel | Zone A | 598 | 550 | 539 |
| Temperature | Zone B | 588 | 550 | 540 |
| | Zone C | 587 | 550 | 528 |
| | Zone D | 577 | 550 | 522 |
| Mold | Zone 1 | 580 | 550 | |
| Temperature | Zone 2 | 580 | 550 | |
| | Zone 3 | 300 | | |
| | Zone 4 | 580 | 550 | |
| | Zone 5 | 300 | 550 | |
| | Zone 6 | 580 | | |
| | Zone 7 | 580 | 550 | |
| | Zone 8 | 600 | 550 | |
| Stationary Mold Temperature | | 272 | 228 | 186 |
| Moving Mold Temperature | | 297 | 286 | 246 |

TABLE III-continued

|  | Time in sec. | | |
|---|---|---|---|
| Injection High | 10.00 | 10.00 | 8.00 |
| Injection Pack | 3.00 | 3.00 | 2.00 |
| Injection Hold | 2.00 | 2.00 | 2.00 |
| Cooling | 60.00 | 120.00 | 140.00 |
| Clamp Open | 0.00 | 0.00 | 0.00 |
| Ejector forward dwell | 0.00 | 0.00 | 0.00 |
| Extruder delay | 0.00 | 0.00 | 0.00 |
| Core Set | 0.80 | 0.80 | 0.80 |
|  | Lb. per sq. inch | | |
| Injection high pressure limit | 2200 | 2200 | 2200 |
| Injection Pack pressure #1 | 800 | 1200 | 1400 |
| Injection Pack pressure #2 | 800 | 1200 | 1400 |
| Injection Hold pressure #1 | 700 | 1050 | 1200 |
| Injection Hold pressure #2 | 700 | 1050 | 1200 |
|  | Inches | | |
| Shot size | 2.70 | 3.10 | 3.30 |
| Transfer position | 1.20 | 0.80 | 0.80 |
| Decompression before | 0.00 | 0.00 | 0.00 |
| Decompression after | 0.30 | 0.30 | 0.22 |

| Injection Profile: | Speed | % of shot size | Speed | % of shot size | Speed | % of shot size |
|---|---|---|---|---|---|---|
| Seq. 1 | 1.00 | 80 | 2.25 | 80 | 2.75 | 80 |
| Seq. 2 | 1.00 | 60 | 2.50 | 60 | 2.50 | 60 |
| Seq. 3 | 1.00 | 40 | 2.25 | 40 | 2.25 | 40 |
| Seq. 4 | 1.00 | 20 | 0.40 | 20 | 2.00 | 20 |
| Seq. 5 | 0.60 | XFER | 0.60 | X-FER | 1.00 | X-FER |

[2]A PPS obtained from Ticona.
[3]A PC/PBT alloy obtained from General Electric.
[4]A polystyrene obtained from Nova Chemicals.

These results could not necessarily be used on another machine; rather a new series of tests would be required. This is also true in the case of a different mold or a different substrate, similar tests would need be run to find optimum conditions.

Having determined the operating parameters for production of the substrate, one must then determine, by reference to appropriate tables or by measurement, the melt temperature of the substrate so that the IMC may be injected at the proper time.

By use of the transducers referred to above with respect to FIG. 3, it is possible to determine when the melt temperature of the molded substrate is reached. This is accomplished by using transducers to note when the temperature of the substrate reaches the melt temperature of the substrate. Alternatively the melt temperature can be indirectly determined by observation of pressure, i.e. that is when the molded part reaches its melt temperature it starts to contract somewhat, thus reducing the pressure. As was noted above, the melt temperature is different with each different polymeric material.

Because transducers are not routinely used in production, the time when the melt temperature is reached and injection of IMC commences is controlled by time. That is the length of time it takes from the time the mold closes until the substrate reaches its melt temperature is determined and is used to control the start of injection of IMC.

EXAMPLES

A series of experiments using Impet 430 as substrate and the Stylecoat® X-primer as the IMC were run. It was determined by temperature measurements that the Impet substrate resin had cooled sufficiently below its 50 seconds after the mold had closed. Three parts were run using a cure time for the IMC of 90 seconds. These parts showed good coating and flow. A time for the IMC of 90 seconds. These parts showed good coating and flow. A further 33 parts were run to confirm these machine settings and all of the parts were acceptable, i.e. good appearance and good adhesion. A further sample was run injecting the IMC only 30 seconds after the mold closed and using a cure time of only 60 seconds. This part was unacceptable because the coating had light areas. This example tends to confirm the correctness of previous machine settings.

Another series of parts were made using Vandar 9114 as a substrate resin. The substrate resin had cooled below its 30 seconds after the mold closed. These parts all demonstrated good appearance, i.e. good even coverage and good adhesion.

COMPARATIVE EXAMPLES

In order to illustrate more clearly the necessity of injecting the IMC at the proper time immediately after the surface of the substrate resin cools to its melt temperature as compared with an injection that occurs too early or too late, a series of experiments was run on a Toshiba 950 injection molding machine using an hydraulic clamp. The substrate resin was Vandar AB700 and the IMC was Stylecoat. The machine settings were determined as described above and were identical except for the time at which the IMC is injected, i.e. the Interval in seconds between the closing of the mold and the commencement of the injection of the IMC.

| Vandar AB700 Lot# LV10327351 | | | | | |
|---|---|---|---|---|---|
| Number of Parts | Delay in seconds after mold is closed | Cure time sec. | Coater setting | Coater speed | Comments: |
| 5 | 10 | 160 | 235 | Slow | Parts have poor appearance with the coating intermingled with the substrate |
| 5 | 15 | 160 | 235 | Slow | Parts have poor appearance with the coating intermingled with the substrate |
| 5 | 25 | 160 | 235 | Slow | Parts have poor appearance with the coating intermingled with the substrate |
| 5 | 40 | 160 | 225 | Slow | Parts have good appearance extended cure time for center of parts to have good cure |
| 5 | 100 | 160 | 235 | Slow | Parts have poor appearance with coating not having good adhesion or good coverage |
| 5 | 120 | 160 | 235 | Slow | Parts have poor appearance with coating not having good adhesion or good coverage |

The above examples clearly demonstrate the necessity of injecting the IMC at the correct time when the surface temperature of the substrate falls to its melt temperature.

While the invention has been described in detail and illustrated by the preceding examples, this is for purposes of illustration only and not as a limitation of the invention which is described in the following claims.

What is claimed is:

1. A process of forming an in-mold coated thermoplastic workpiece comprising the steps of:
   (a) injecting, using an injection high pressure, into a mold comprising a fixed mold half and a movable mold half, and which is maintained in a closed position under a clamping pressure, greater than said injection high pressure, a thermoplastic material which is at a temperature above its melt temperature, to fill at least about 75 percent of said mold;
   (b) continuing, using an injection pack pressure which is less than said injection high pressure, to inject said thermoplastic material which is at or above its melt temperature into said mold which is maintained in a closed position under said clamping pressure until said mold is filled to at least 99 percent of its capacity;
   (c) maintaining said thermoplastic material, as it cools, under a hold pressure, which is less an said injection pack pressure, in said closed mold, which is maintained under said clamping pressure, to form a workpiece; (d) injecting into said closed mold while maintained under said clamping pressure and immediately after the surface temperature of said thermoplastic forming said workpiece falls below a melt temperature, a predetermined amount of in-mold coating material to coat at least a portion of the surfaces of said workpiece; and
   (e) releasing said clamping pressure, opening said mold and removing said in-mold coated workpiece after said in-mold coating material has at least partially cured.

2. The process of claim 1, wherein the thermoplastic is chosen from the group consisting of polyester, polystyrene, PBT copolymer, polypropylene, TPUs, ABS, VC, polycarbonates, PP/PS alloys, polyethylene, nylon, polyacetal, SAN, acrylics, PC alloys and PP alloys.

3. The process of claim 1, wherein the in-mold coating material is a thermosetting composition capable of being cured by free radical initiation at a temperature below the melt temperature of said thermoplastic.

4. The process of claim 2, wherein the in-mold coating material is a thermosetting composition capable of being cured by free radical initiation at a temperature below the melt temperature of the thermoplastic.

5. The process according to claim 2, wherein said in-mold coating material is selected from the group consisting of polyurethanes, epoxy-amines, and acrylics.

6. The process according to claim 4, wherein said in-mold coating material comprises an epoxy resin further comprising an epoxy-based oligomer having at least two acrylate groups and at least one copolymerizable ethylenically unsaturated monomer and at least one copolymerizable monoethylenically unsaturated compounds having a —CO—group and a —NH2—, —NH—, or —OH— group.

7. The process according to claim 4, wherein said in-mold coating material comprises at least one acrylic oligomer from a saturated aliphatic polyester urethane intermediate, a saturated (cyclo) aliphatic (meth) acrylate, one or more hydroxy alkyl (meth)acrylates, a polyacrylate ester of an alkylene polyol, one or more vinyl substituted aromatics, and an intiator capable of generating free radicals in said coating composition.

8. The process according to claim 7, wherein said saturated (cyclo) aliphatic (meth) acrylate is present in said in-mold coating material in an amount of from about 20 to about 100 parts by weight per 100 total parts by weight of said polyester urethane acrylate.

9. The process according to claim 7, wherein said saturated (cyclo) aliphatic (meth) acrylate is present in said in-mold coating material in an amount of ram about 50 to about 80 parts by weight per 100 total parts by weight of said polyester urethane acrylate.

10. The process according to claim 7, wherein said hydroxy alkyl (meth) acrylates are present in said in-mold coating material in an amount of from about 2 to about 20 parts by weight per 100 parts by weight of said polyester urethane acrylate.

11. The process according to claim 7, wherein said hydroxy alkyl (meth) acrylates are present in said in-mold coating material in an amount of from about 8 to about 12 parts by weight per 100 parts by weight of said polyester urethane acrylate.

12. The process according to claim 7, wherein said vinyl substituted aromatics are present in said in-mold coating material in an amount of from about 10 to about 70 parts by weight per 100 parts by weight of said polyester urethane acrylate.

13. The process according to claim 7, wherein said polyacrylate ester of an alkylene polyol is present in said in-mold coating material in an amount of from about 10 to about 40 parts by weight for per 100 parts by weight of said polyester urethane acrylate.

14. The process according to claim 7, wherein said polyacrylate ester of an alkylene polyol is present in said in-mold coating material in an amount of from about 20 to about 30 parts by weight for per 100 parts by weight of said polyester urethane acrylate.

15. The process according to claim 7, wherein said in-mold coating material composition comprises graphite, titanium dioxide, carbon black and talc.

16. The process according to claim 7, wherein said saturated (cyclo) aliphatic (meth) acrylate is isobornyl acrylate.

17. The process according to claim 7, wherein said hydroxy alkyl (meth) acrylate is hydroxypropyl methacrylate.

18. The process according to claim 7, wherein said polyacrylate ester of an alkylene polyol is hexane diol acrylate.

19. The process according to claim 7, wherein said initiator is selected from the group consisting of tertiary butyl perbenzoate, tertiary butyl peroctoate and mixtures thereof.

20. The process according to claim 19, wherein said initiator is tertiary butyl perbenzoate.

21. The process according to claim 7, wherein said initiator comprises a peroxide compound.

22. The process according to claim 7, wherein said initiator comprises an azo-initiator.

23. The process according to claim 21, wherein said peroxide compound is selected from the group consisting of diacetyl peroxide in dimethyl phthalate, dibenzoyl peroxide, di (p-chlorobenzoyl) peroxide in dibutyl phthalate, di (2,4-dichlorobenzoyl) peroxide in dibutyl phthalate dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy (2-ethyl hexanoate), caprylyl peroxide, 2,5-dimethyl-2,5-di (benzoyl peroxy) hexane, 1-hydroxy cyclohexyl hydroperoxide-1, t-butyl peroxy (2-ethyl butyrate), 2,5-dimethyl-2,5-bis (t-butyl peroxy) hexane, cumylhydroperoxide, diacetyl peroxide, t-butyl hydroperoxide, ditertiary butyl peroxide, 3,5-dihydroxy-3, 5-dimethyl-1,2-oxacyclopentane, 1,1-bis (t-butylperoxy)-3, 3,5-trimethyl cyclohexane, and mixtures thereof.

24. The process according to claim 3, wherein said coated thermoplastic workpiece is suitable for use as is in an end use application.

25. The process according to claim 7, wherein said initiator is present in an amount of from about 0.25% to about 5% by weight based upon the total weight of the components comprising said in-mold coating material.

26. The process according to claim 7, wherein said initiator is present in an amount of from about 1% to about 2% by weight based upon the total weight of the components comprising said in-mold coating material.

27. The process according to claim 3, wherein said thermoplastic substrate is a polycarbonate alloy.

28. The process according to claim 3, wherein said thermoplastic substrate is a polyester.

29. A process of forming an in-mold coated article comprising the steps of:
  (a) injecting a first composition into a mold cavity;
  (b) cooling said first composition in said mold cavity to form a molded article; and
  (c) injecting a second composition into said mold cavity; wherein said mold cavity has a substantially fixed volume throughout said steps (a)–(c).

30. The process of claim 29 wherein the step of injecting said first composition includes the sub-steps of:
  injection said first composition into said mold cavity under a first pressure until said cavity is about 75 percent filled; and
  continue injecting said first composition into said mold cavity under a second pressure which is less than said first pressure until said cavity is at least about 99 percent filled.

31. The process of claim 30 wherein the step of cooling the first composition includes the sub-step of:
  maintaining said first composition under a third pressure which is less than said second pressure at least until said first composition has cooled sufficiently to form said molded article.

32. The process of claim 29 wherein the step of coating the first composition includes the sub-step of:
  maintaining said first composition under a hold pressure.

33. The process of claim 29 wherein the step of injecting said second composition occurs immediately after said first composition falls below a melt temperature corresponding to said first composition.

34. A method of forming an in-mold coated article comprising the steps of:
  (a) injecting a first composition into a mold cavity defined between at least two mold members;
  (b) cooling said first composition in said mold cavity; and
  (c) injecting a second composition into said mold cavity and onto a surface of said molded article to coat said surface; wherein said at least two mold members are maintained a substantially fixed distance relative to one another throughout steps (a)–(c).

35. The method of claim 34 wherein said mold cavity has a substantially fixed volume during steps (a), (b) and (c) that remains substantially unchanged in steps (a), (b) and (c).

* * * * *